US007769274B2

(12) United States Patent
Yeh et al.

(10) Patent No.: US 7,769,274 B2
(45) Date of Patent: Aug. 3, 2010

(54) VIDEO PROCESSING AND OPTICAL RECORDING USING A SHARED MEMORY

(75) Inventors: You-Min Yeh, Chi-Lung (TW); Chien-Chung Chen, Taipei Hsien (TW)

(73) Assignee: MediaTek, Inc., Hsin-Chu (TW)

( * ) Notice: Subject to any disclaimer, the term of this patent is extended or adjusted under 35 U.S.C. 154(b) by 1392 days.

(21) Appl. No.: 11/124,434

(22) Filed: May 6, 2005

(65) Prior Publication Data

US 2006/0251064 A1 Nov. 9, 2006

(51) Int. Cl.
*H04N 5/85* (2006.01)
(52) U.S. Cl. .................................. 386/112; 386/126
(58) Field of Classification Search .......... 386/109–112, 386/124–126; 348/425.1; 375/240.26
See application file for complete search history.

(56) References Cited

U.S. PATENT DOCUMENTS

| 5,159,336 | A | * | 10/1992 | Rabin et al. ............... 341/51 |
| 5,684,542 | A | * | 11/1997 | Tsukagoshi ................ 348/468 |
| 5,781,788 | A | * | 7/1998 | Woo et al. ................. 712/1 |
| 5,870,087 | A | * | 2/1999 | Chau ....................... 715/202 |
| 6,058,459 | A | * | 5/2000 | Owen et al. ............... 711/151 |
| 6,154,603 | A | * | 11/2000 | Willis et al. .............. 386/125 |
| 6,330,214 | B1 | | 12/2001 | Ohta et al. |
| 6,388,968 | B1 | | 5/2002 | Ohta et al. |
| 6,496,199 | B1 | * | 12/2002 | Peng et al. ................ 345/658 |
| 6,516,137 | B1 | | 2/2003 | Posch et al. |
| 6,519,287 | B1 | * | 2/2003 | Hawkins et al. .......... 375/240.16 |
| 6,718,443 | B2 | * | 4/2004 | Yoshida .................... 711/147 |
| 6,985,411 | B2 | * | 1/2006 | Kanegae et al. .......... 369/30.04 |
| 2002/0114392 | A1 | * | 8/2002 | Sekiguchi et al. ........ 375/240.15 |
| 2004/0187165 | A1 | * | 9/2004 | Kai et al. .................. 725/134 |
| 2004/0221325 | A1 | * | 11/2004 | Nakajima et al. ......... 725/145 |
| 2004/0246863 | A1 | * | 12/2004 | Ando et al. ............... 369/59.22 |
| 2005/0123278 | A1 | * | 6/2005 | Yamashita et al. ........ 386/94 |

FOREIGN PATENT DOCUMENTS

| EP | 01152612 A2 | 11/2001 |
| JP | 2004-96248 | * 3/2004 |

* cited by examiner

*Primary Examiner*—David E Harvey
(74) *Attorney, Agent, or Firm*—Fish & Richardson P.C.

(57) ABSTRACT

A combined digital TV decoding and optical recording system includes a transport stream demultiplexer to demultiplex at least one compressed multimedia stream from an MPEG transport stream having multiplexed compressed multimedia streams. A video encoder compresses a video stream to generate a second compressed video stream. A common system controller controls operations of the transport stream demultiplexer and the video encoder, and allocates portions of a memory to the transport stream demultiplexer and the MPEG video encoder based on respective memory requirements.

1 Claim, 5 Drawing Sheets

VIDEO PROCESSING AND OPTICAL RECORDING USING A SHARED MEMORY

BACKGROUND

This description relates to video processing and optical recording.

In one example, a digital television signal includes modulated multiplexed transport stream signals that are compressed according to, e.g., MPEG (Moving Picture Experts Group) standard, defined in ISO/IEC MPEG specification, also referred to as ISO/IEC 13818, herein incorporated by reference. The MPEG encoded signals are modulated using, e.g., vestigial side band (VSB) modulation or quadrature amplitude modulation (QAM). The digital television signal may comply with, e.g., ATSC (Advanced Television Systems Committee), DVB (Digital Video Broadcasting), or ISDB (Integrated Services Digital Broadcasting) standard.

A viewer of a digital TV program uses a digital TV processing module, such as a set top box or an integrated receiver, to process the digital TV signal and generate analog audio and video signals that can be output to speakers and a display (e.g., a cathode ray tube or a flat panel display). The digital TV processing module includes a system controller to control processing of the digital TV signal, including demodulation, MPEG decoding, video post-processing, and TV encoding, such as PAL (phase-alternating line), NTSC (National Television Systems Committee), or SÉCAM (sequentiel couleur avec mémoire) encoding. A dynamic random access memory (DRAM) is provided in the set top box to store data during processing of the digital TV signal.

A DVD recording system can store multimedia data on a digital versatile disc (DVD) that complies with standards established by DVD Forum. In one example, audio and video signals are compressed and multiplexed according to the MPEG standard, and channel encoded according to the DVD standard. The DVD recording system includes a system controller to control processing of the audio and video signals, including MPEG encoding and EFM+ (eight-to-sixteen) modulation. A DRAM buffer is provided in the DVD recording system to store data during the processing of the audio and video signals.

The DVD recording system typically includes playback functionality, in which multimedia data retrieved from the DVD disc are processed to generate analog audio and video signals that can be output to the speakers and the display. The system controller in the DVD recording system controls processing of the data retrieved from the DVD disc, including EFM+ demodulation and MPEG decoding. The DRAM buffer in the DVD recording system is used to store data during processing of the data read from the DVD disc.

The system controller and DRAM of the digital TV signal processing module operate independently of the system controller and DRAM of the DVD recording system.

SUMMARY

In general, in one aspect, the invention features an apparatus that includes a transport stream demultiplexer to demultiplex at least one compressed video stream from an encoded transport stream having multiplexed compressed video streams, a video encoder to compress a video stream to generate a second compressed video stream, and a controller to allocate portions of a shared memory to the transport stream demultiplexer and the video encoder based on respective memory requirements.

Implementations of the invention may include one or more of the following features. The apparatus includes a common memory controller for controlling access to the memory by the transport stream demultiplexer and the video encoder. The apparatus includes a demodulator to demodulate a signal from a digital television tuner to generate the encoded transport stream. The apparatus includes a recording module to record at least one of the compressed video streams demultiplexed by the transport stream demultiplexer and the second compressed video stream to a recording medium. The apparatus includes a transport stream to program stream encoder to convert the demultiplexed compressed video stream into an MPEG program stream. The apparatus includes a program stream to transport stream encoder to convert the second compressed video stream into an MPEG transport stream. The apparatus includes at least one of a video decoder, a video post-processor, an audio encoder, and an audio decoder, in which the controller allocates portions of the shared memory to the at least one of the video decoder, the video post-processor, the audio encoder, and the audio decoder based on respective memory requirements.

In general, in another aspect, the invention features a system that includes a demodulator to demodulate a signal from a digital television tuner to generate an MPEG transport stream having multiplexed compressed video streams, a transport stream demultiplexer to demultiplex at least one compressed video stream from the MPEG transport stream, an MPEG video decoder to decode the compressed video stream, an MPEG video encoder to compress another video stream to generate a second compressed video stream, and a memory shared by the transport stream demultiplexer, the MPEG video decoder, and the MPEG video encoder. The system includes a controller to control the transport stream demultiplexer, the video decoder, and the video encoder, and allocate portions of the shared memory to the transport stream demultiplexer, the video decoder, and the video encoder based on respective memory requirements. The system includes a recording module to record at least one of the compressed video streams demultiplexed by the transport stream demultiplexer and the second compressed video stream to a recording medium.

In general, in another aspect, the invention features a system that includes a system controller to control operations of a first module for decoding a digital TV signal and a second module for encoding a video signal for recording to an optical recording medium, and a system resource shared by the first and second modules, the system controller allocating portions of the system resource to the first and second modules based on requirements of the modules.

Implementations of the invention may include one or more of the following features. The system resource includes memory. The system controller adjusts speeds of the first and second modules so that peak requirements of the system resource from the first and second modules occur at controlled times. The first module includes an MPEG decoder to decode the MPEG encoded audio and video signals. The second module includes an MPEG encoder for compressing the video signal according to MPEG encoding to generate a compressed video signal.

In general, in another aspect, the invention features a system that includes means for dynamically allocating portions of a shared memory for use in (a) demultiplexing a signal having multiplexed digitally encoded video streams and (b) encoding another video stream, and means for simultaneously demultiplexing the signal and encoding the other stream using the respective allocated portions of the memory.

In general, in another aspect, the invention features a system that includes a system controller to control operations of a first module for decoding a digital radio signal and a second module for encoding an audio signal for recording to an optical recording medium, and a memory shared by the first and second modules, the system controller allocating portions of the memory to the first and second modules based on requirements of the modules.

In general, in another aspect, the invention features a method that includes dynamically allocating portions of a shared memory for use in (a) demultiplexing a signal having multiplexed digitally encoded video streams and (b) encoding another video stream, and demultiplexing the signal and encoding the other stream using the respective allocated portions of the memory.

Implementations of the invention may include one or more of the following features. The method includes controlling the demultiplexing and the encoding operations using a common controller. Demultiplexing a signal having multiplexed digitally encoded video streams includes demultiplexing an MPEG transport stream having multiplexed MPEG encoded video streams to select one of the MPEG encoded video streams. The method includes converting a selected MPEG encoded video stream into an MPEG program stream, and storing data used during the conversion in the shared memory. The method includes encoding the MPEG program stream according to an optical storage standard to generate a signal suitable for storage in an optical storage medium that supports direct recording of an MPEG program stream, and storing data used during the encoding of the MPEG program stream in the memory. The method includes decoding the selected MPEG encoded video stream according to MPEG decoding, and storing data used during the decoding in the shared memory. The other video stream is encoded to generate an MPEG program stream, and the method also includes converting the MPEG program stream into an MPEG transport stream, and storing data used during the decoding in the memory. The method includes encoding the MPEG transport stream according to an optical storage standard to generate a signal suitable for storage in an optical storage medium that supports direct recording of an MPEG transport stream, and storing data used during the encoding of the MPEG transport stream in the memory.

In general, in another aspect, the invention features a method that includes using a controller to control operations of a first module for decoding a digital TV signal and a second module for encoding a video signal for recording to an optical recording medium, and storing data used during operations of the first and second modules in a shared memory, in which allocation of a first portion of the memory to store data used by the first module is partially dependent on an operation condition of the second module.

Implementations of the invention may include one or more of the following features. The method includes dynamically allocating a first portion of the memory to store data used during operations of the first module, and dynamically allocating a second portion of the memory to store data used during operation of the second module. The method includes adjusting speeds of the first and second modules so that peak requirements of the memory from the first and second modules occur at controlled times. The method includes demodulating a digital TV signal. Operations of the first module include demultiplexing an MPEG transport stream derived from the demodulated digital TV signal to generate MPEG encoded audio and video signals. Operations of the first module include decoding the MPEG encoded audio and video signals according to MPEG decoding to generate decoded audio and video signals. Operations of the first module include video post-processing the decoded video signal to improve image quality of the video signal. Operations of the first module include encoding the post-processed signal to generate an encoded signal that can be displayed on a television. Operations of the second module include compressing the video signal according to MPEG encoding to generate a compressed video signal. Operations of the second module include encoding the compressed video signal according to an optical storage standard to generate a signal having a waveform suitable for storage on an optical storage medium. Operations of the first module include converting an MPEG transport stream derived from the digital TV signal into an MPEG program stream. Operations of the second module include converting an MPEG program stream derived from the video signal into an MPEG transport stream.

In general, in another aspect, the invention features a computer program product that causes a controller to perform operations including setting register values to control operations of a first module for decoding a digital TV signal and a second module for encoding a video signal for recording to an optical recording medium, and dynamically allocating a first portion of a memory to store data used during operations of the first module, and dynamically allocating a second portion of the memory to store data used during operations of the second module.

In general, in another aspect, the invention features a method that includes using a common controller to control operations of a first module for decoding a digital radio signal and a second module for encoding an audio signal for recording to an optical recording medium, and storing data used during operations of the first and second modules in a shared memory, in which allocation of a first portion of memory to store data used by the first module is partially dependent on an operation condition of the second module.

All of the publications, patent applications, patents, and other references mentioned are incorporated herein by reference. In case of conflict with the references incorporated by reference, the present specification, including definitions, will control.

DESCRIPTION

Figure 1:
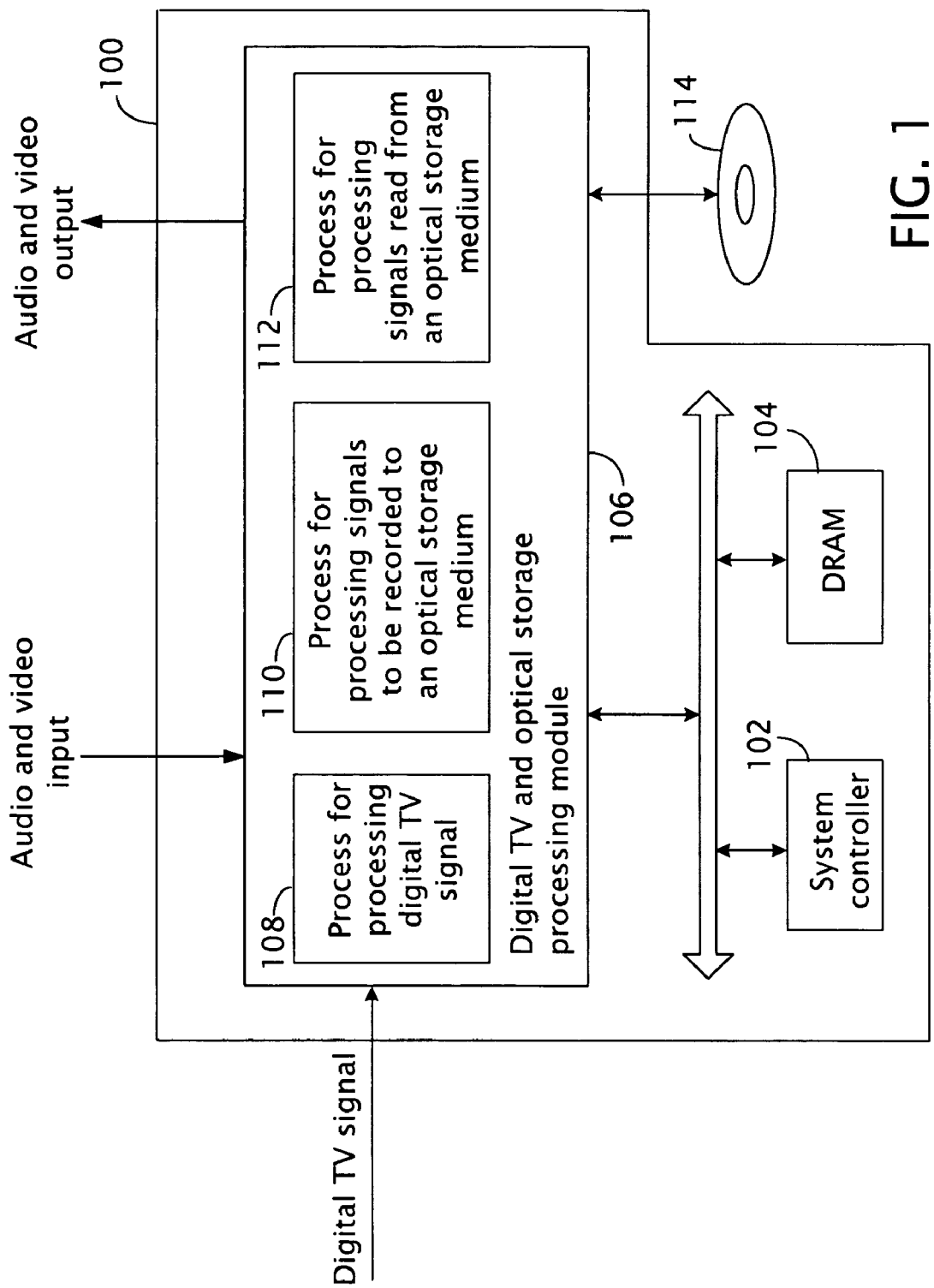
FIGS. 1-3 show diagrams of a combined digital TV decoding and optical recording system.

FIG. 1 shows a schematic diagram of a combined digital TV decoding and optical recording system 100 that has a common system controller 102 and a common DRAM 104. The system controller 102 controls both a digital TV and an optical storage processing module 106, which executes a process 108 for processing a digital TV signal, a process 110 for processing multimedia signals to be recorded to an optical storage medium 114, and a process 112 for processing encoded multimedia signals retrieved from the optical storage medium 114. The DRAM 104 stores data generated by the module 106 while executing the processes 108, 110, and 112. By using a common system controller 102 and a common DRAM 104, system resources can be used more efficiently and the amount of memory can be reduced.

In one example, the system controller 102 is an embedded controller that is embedded in an integrated circuit that includes an MPEG encoder and decoder. The DRAM 104 can be, e.g., double data rate (DDR) DRAM.

A digital TV signal can be processed at the same time that multimedia signals are recorded to the optical storage medium 114. For example, a user may view a first digital TV program at the same time that a second digital TV program is being recorded onto the optical storage medium 114. The system controller 102 allocates a first portion of the DRAM 104 for decoding the digital TV signal, and allocates a second portion of the DRAM 104 for processing data recorded to or read from the optical storage medium 114. The system controller 102 determines the sizes of the first and second DRAM portions based on operation requirements, in which the sizes of the first and second DRAM portions may change over time.

For example, the memory that is allocated for each process may depend on the encoding or decoding standard that is being supported, the bandwidth of the input transport stream, and how many multiplexed streams are being processed.

In one example, a memory buffer of 512 mega bits (Mbits) is used to process two high definition TV signals having a total bandwidth of 1 gigabytes per second. A memory buffer of 256 Mbits is used to process an analog standard definition video signal and associated analog stereo audio signals for storage in the optical storage medium 114. If separate system controllers were used to control the processing of the digital TV signal and the processing of the multimedia signals for storage, one system controller would not know the system resource requirements of the processes controlled by the other system controller, so a memory of 768 Mbits is used to accommodate the peak requirements of both processes.

In one example, by having the combined system controller 102 and a common DRAM 104, only 512 Mbits of memory is used for processing the high definition TV signals and the analog multimedia signals. When executing the processes 108, 110, and 112, the amount of memory required to temporarily store data varies depending on the stage of the processing. The combined system controller 102 can determine when the processes 108, 110, and 112 will have peak memory requirements, and either slow down or speed up one of the processes 108, 110, and 112 so that the peak memory requirements from the three processes 108, 110, and 112 do not occur at the same time, thereby allowing a smaller DRAM 104 to be shared by the three processes 108, 110, and 112. The system controller 102 can also adjust the quality of the encoding and decoding processes in response to the amount of memory resources available.

In another example, a combined system controller 102 and a common DRAM 104 of 768 Mbits are used. While the memory size is the same as the case when separate controllers were used, sharing a common memory and a common controller has the advantage that the controller has more flexibility in allocating memory portions, and can improve the quality of one process if the memory requirement of another process is reduced. In the example above, if instead of processing high definition TV signals, standard definition TV signals were processed, more memory and bandwidth can be allocated for encoding the analog multimedia signals to implement more complex encoding algorithms to achieve a higher compression ratio and/or a better audio/video quality.

Using a common system controller and a common DRAM 104 reduces component costs, circuit board size, and power consumption. For example, the transport stream demultiplexer 115 and the video encoder 154 each uses a portion of memory as output buffer. When a shared memory is used, a single output buffer in memory may be shared by both the demultiplexer 115 and the video encoder 154. In addition, sharing of information among the three process 108, 110, and 112 would be more efficient by using a common system controller. If two controllers were used, a more complicated hand-shaking protocol would be required for the two controllers to communicate with each other.

Figure 2:
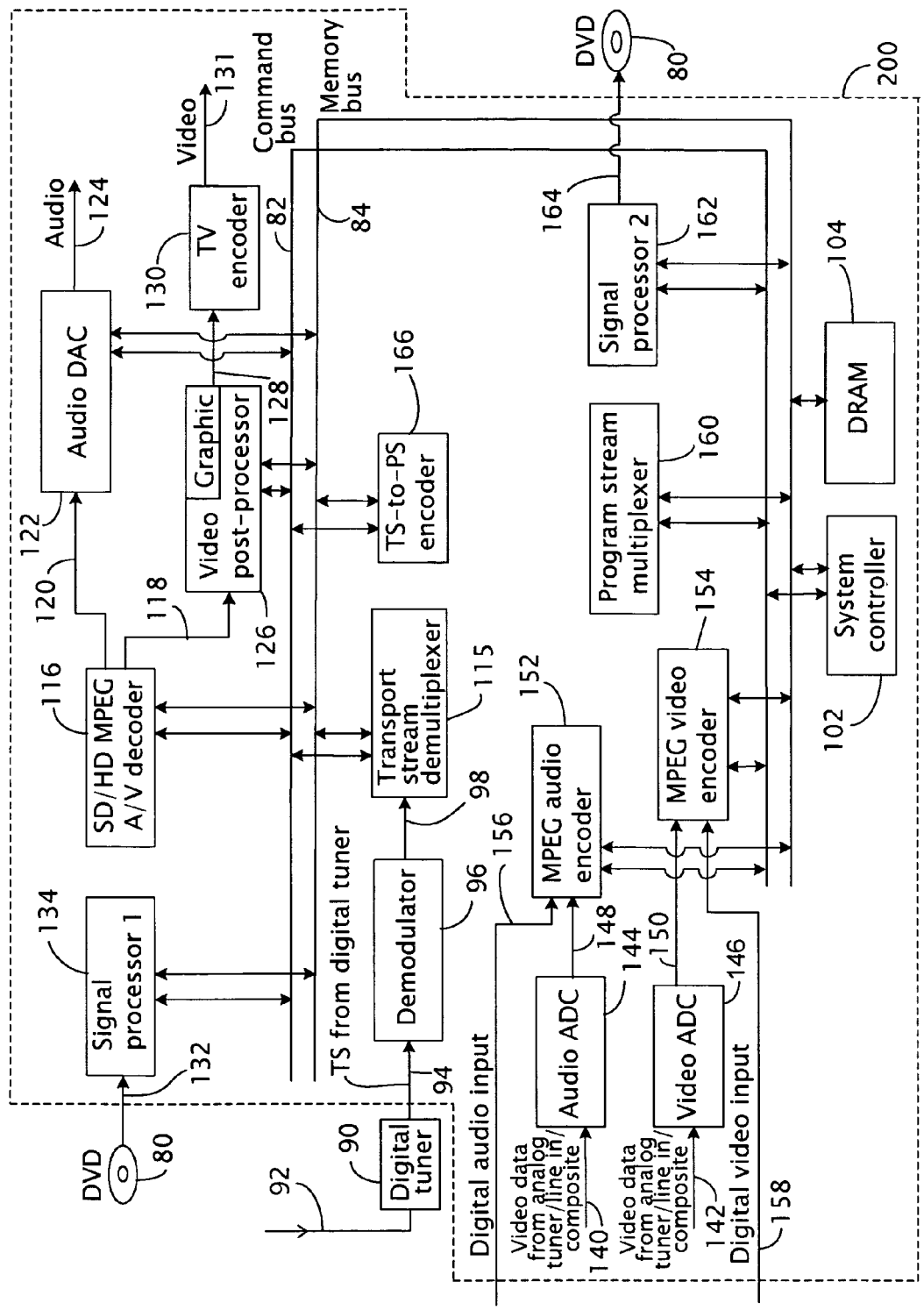

FIG. 2 shows a block diagram of an example of a combined digital TV decoding and optical recording system 200, in which the optical storage medium is a DVD disc 80. The DVD disc 80 can be a DVD-R, DVD+R, DVD-RW, DVD+RW, DVD-RAM, double layer DVD-R, double layer DVD+R disc, or other recordable or rewritable discs that support direct recording of MPEG program streams.

The system 200 includes components for processing a digital TV signal and components for processing signals to be written to and retrieved from the DVD disc 80. A command bus 82 is provided for transmitting control information between the system controller 102 and other components of the system 200. A memory bus is provided to allow components of the system 200 to access the DRAM 104.

Processing of a Digital TV Signal

The following describes processing of a digital TV signal. A digital tuner 90 receives a digital television signal 92 from, e.g., a cable or an antenna. The signal 92 includes audio and video signals that are compressed using the MPEG standard and modulated using VSB or QAM modulation. The tuner 90 filters the signal 92 to select a physical channel, and outputs a modulated transport stream 94.

The term "physical channel" refers to a channel having a specific bandwidth (e.g., 6 to 8 MHz) and occupies a particular frequency band. The physical channels have center frequencies that are spaced 6 to 8 MHz apart. Each physical channel may include an MPEG transport stream having one or more programming channels, depending on the bit rate of the programming channels.

The term "programming channel" refers to a channel that includes audio, video, and auxiliary signals associated with a program, such as a movie program or a news program. Auxiliary signals may include, e.g., captioning information. Each programming channel may have a bit rate of 3 mega bits per second (Mbps) to 18 Mbps, depending on the program content and on whether the program is standard definition (having 704×480 resolution for NTSC, 768×576 or 1024×576 for PAL) or high definition (having 1280×720 or 1920×1080 resolution).

The MPEG standard specifies two stream formats: a "program stream" format that is more suitable for error-free environments, and a "transport stream" format that is more suitable for error-prone environments, such as satellite and cable networks. A program stream includes streams (e.g., a video stream, one or more audio streams, and a private data stream) that is associated with a single program. A program stream includes packets that have variable lengths, in which packets from different streams associated with the same program are time-multiplexed in the program stream. A transport stream can include streams from one or multiple programs. A transport stream includes packets that have fixed-lengths—188 bytes, in which packets from different streams of different programs are time-multiplexed in the transport stream.

A demodulator 96 demodulates the transport stream 94 according to VSB or QAM demodulation to generate an MPEG transport stream 98. A transport stream demultiplexer 115 demultiplexes the transport stream 98 to separate the multiplexed programming channels into individual programming channels, and to separate video, audio, and auxiliary signals in each programming channel into separate streams to be stored in the DRAM 104.

Some digital TV tuners 90 have built-in demodulators. In that case, the output of the digital TV tuner 90 is sent directly to the transport stream demultiplexer 115.

The video and audio signals output by the transport stream demultiplexer 115 have been compressed according to the MPEG algorithm. A standard definition or high definition MPEG audio/video decoder 116 retrieves the video, audio, and auxiliary signals stored in the DRAM 104, and decodes the signals to generate decompressed video 118, audio 120, and auxiliary signals. The video decoding process includes inverse zigzag ordering, inverse quantization, inverse discrete cosine transformation, and motion compensation. During motion compensation, reference frames such as intra (I) or predicted (P) frames are stored in the DRAM 104 and are used to reconstruct compressed frames such as P or bi-directional predicted (B) frames based on motion compensation vectors. The reconstructed P or B frames may also be stored in the DRAM 104

The decompressed audio signals 120 are in digital format, which is converted into analog signals 124 by an audio digital-to-analog converter 122. The analog signals 124 can be output to audio speakers.

The decompressed video signal 118 is processed by a video post-processor 126 that performs video post-processing, which may include, e.g., a de-blocking process to smooth the transitions between adjacent macroblocks of an image, a de-ringing process to remove sudden transitions from one image to a subsequent image, a scaling process to scale the image to fit the resolution of the display or to meet a specific requirement of the viewer, and a color space transformation to adjust the color profile of the image according to the color gamut of the display. During video post-processing, the post-processed video data is stored in the DRAM 104.

A TV encoder 130 encodes the post-processed video signal 128 into an analog video signal 131 according to, e.g., PAL, NTSC, or SECAM standard so that the analog video signal 131 can be shown on a television. Some digital televisions can accept the post-processed video signal 128 directly, in which the TV encoder 130 is not required.

The system controller 102 uses the decompressed auxiliary signals for functions such as captioning, surround mode selection, menu screen generation, and electronic program guide (EPG).

Playback From Optical Storage

When playing multimedia programs stored on the DVD disc 80, an optical pickup head (not shown) reads data from the disc 80 and outputs a multimedia signal 132 that is channel encoded and EFM+ modulated according to the DVD standard. A first signal processor 134 demodulates and decodes the signal 132 according to the DVD standard, and stores the multimedia signal in the DRAM 104. The multimedia signal output from the first signal processor 134 includes audio and video signals that are compressed according to the MPEG algorithm, and are processed by the MPEG audio and video decoder 116, the audio DAC 122, the video post-processor 126, and the TV encoder 130 similar to the processes described above for processing of the digital TV signal 92.

Processing of Multimedia Signals for Optical Storage

Analog multimedia signals can be processed for storage to the DVD disc 80. An analog audio signal 140 can be received from, e.g., an analog television tuner (not shown), audio line-in jacks that receive separate left and right audio channels (and additional surround sound channels), or from a composite input. An analog video signal 142 can be received from, e.g., an analog television tuner (not shown), video line-in jacks that receive separate red, green, and blue color signals, or from a composite input. The analog audio and video signals 140 and 142 are converted to digital format by an audio analog-to-digital converter (ADC) 144 and a video ADC 146, respectively. Digital audio and video signals 156 and 158 can also be provided from a digital co-axial cable or a fiber optic cable.

The digital audio and video signals 148 and 150 are encoded by an MPEG audio encoder 152 and an MPEG video encoder 154, respectively, according to the MPEG standard. The encoding process includes, e.g., defining I frames, compressing the I frames using intraframe compression, and compressing P and B frames using motion compensation to generate motion vectors that represent movements and differences between macroblocks in the P or B frames and macroblocks in the I-frame. After motion compensation is performed, discrete cosine transformation, quantization, run length coding, and zigzag ordering of data are used to further compress the multimedia signals. During the encoding process, the I and P frames are stored in the DRAM 104 for use in determining motion vectors for P and B frames.

The MPEG audio encoder 152 and video encoder 154 compresses the audio and video signals, respectively, so that a standard definition multimedia program having a bit rate of about 50 Mbps can be compressed to about 3 Mbps, and a high definition multimedia program having a bit rate of about 270 Mbps can be compressed to about 18 Mbps.

A program stream multiplexer 160 retrieves the compressed audio and video signals from the DRAM 104, and multiplexes the audio and video signals to generate a program stream. The program stream includes packet headers, each followed by a number of packetized elementary stream (PES) packets. The packet header includes control information, such as a presentation time stamp that indicates when the multimedia content in the PES packet is to be output (e.g., to a display and speakers). The program stream multiplexer 160 stores the program stream having multiplexed audio and video signals in the DRAM 104.

A second signal processor 162 retrieves the program stream from the DRAM 104, and encodes the program stream into a format suitable for storage in a DVD disc, including adding identification codes, scrambling, error correction encoding, and applying EFM+ modulation according to the DVD standard. The second signal processor 162 generates a modulated program stream 164 to drive a laser pickup head (not shown) to write the modulated program stream 164 in the DVD disc 80.

A transport stream to program stream encoder (abbreviated as TS-to-PS encoder) 166 is provided to convert the transport stream signal generated by the transport stream demultiplexer 115 into a program stream format. The program stream can then be processed by the second signal processor 162 for storage in the DVD disc 80. This allows a user to store digital TV programs in the DVD disc 80. An example of the TS-to-PS encoder 166 can be found in U.S. patent application Ser. No. 11/086,543, filed Mar. 22, 2005, titled "Systems and Method for Stream Format Conversion," herein incorporated by reference.

System Controller

The system controller 102 controls operations of the modules in the system 200 by setting values of registers in the system 200 at various stages of the processes. For example, the viewer may watch a digital TV program while storing the program in the DVD disc 80. The system controller 102 controls the demodulator 96, the transport stream demultiplexer 115, the MPEG decoder 116, the audio DAC 122, the video post processor 126, and the TV encoder 130 according to interrupts or status information sent from those units to allow a digital TV program to be shown on a television. At the same time, the system controller 102 controls the transport stream demultiplexer 115, the TS-to-PS encoder 166, and the second signal processor 162 according to the interrupts or status information sent from those units, so that the digital TV program can be stored in the DVD disc 80.

In another example, the viewer watches a digital TV program while storing a video from an analog camcorder (not shown) to the DVD disc 80. The operation of the system controller 102 in controlling processing of the digital TV signal is similar to that described above. At the same time, the system controller 102 controls the audio and video ADCs 144 and 146, the MPEG audio and video encoders 152 and 154, the program stream multiplexer 160, and second signal processor 162, so that the analog video can be stored in the DVD disc 80.

In another example, the viewer watches an analog TV program while storing the analog TV program to the DVD disc 80. The analog audio signal 140 and the analog video signal 142 can be sent to the speakers and the television to allow the user to view the analog TV program. The system controller 102 controls the audio and video ADCs 144 and 146, the MPEG audio and video encoders 152 and 154, the program stream multiplexer 160, and the second signal processor 162 so that the analog video signal can be stored in the DVD disc 80, as described above.

In another example, the viewer watches a movie program stored in the DVD disc 80 while at the same time watches a digital TV news program using a picture-in-picture function. The operation of the system controller 102 in controlling processing of the digital TV signal is similar to that described above, except that the output of the digital TV program is output to a small window of the display rather than the full display. At the same time, the system controller 102 controls the first signal processor 134, the MPEG A/V decoder 116, the video post processor 126, the TV encoder 130, and the audio DAC 122 properly, so that the multimedia program in the DVD disc can be viewed on the display.

Figure 3:
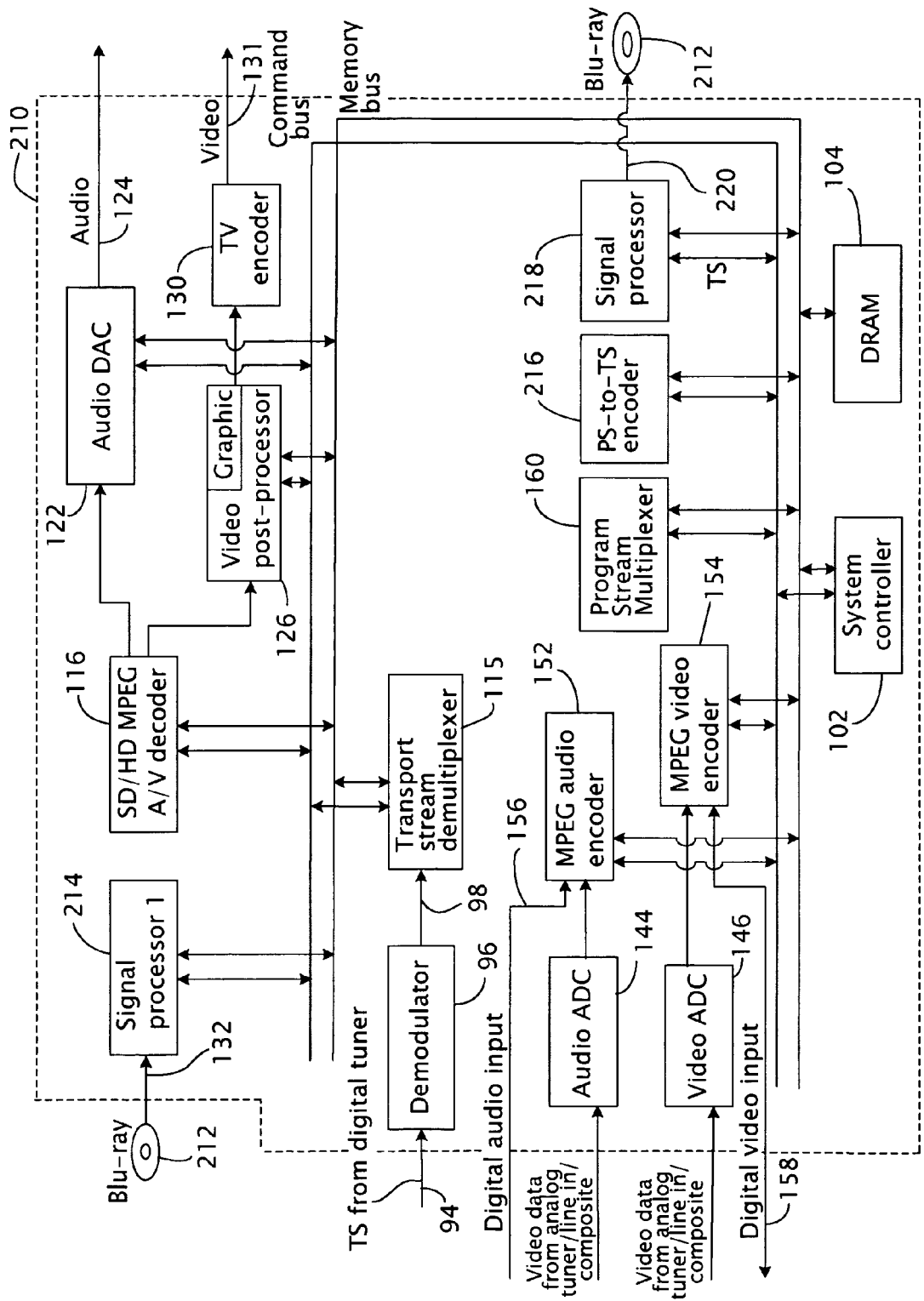

Alternative Example of the Combined Digital TV Decoding and Optical Recording System FIG. 3 shows a block diagram of an example of a combined digital TV decoding and optical recording system 210, in which the optical storage medium is a Blu-ray disc 212 that is compatible with the Blu-ray Disc standard established by the Blu-ray Disc Association. The Blu-ray disc 212 can be, e.g., a recordable (BD Recordable), a rewritable (BD Recordable), or other optical discs that support direct recording of MPEG transport streams. A Blu-ray Disc drive (not shown) is used to access the Blu-ray disc 212 and generate an output signal 133.

The system 210 includes a controller 102 for controlling various other modules of the system 210, and a DRAM 104 to store data during processing of the digital TV signal and multimedia signals written to or retrieved from the Blu-ray disc 212.

To process the digital TV signal 94, the system 210 includes a demodulator 96 and a transport stream demultiplexer 115 similar to those in system 200 (FIG. 2). A TS-to-PS encoder is not required in system 210 because the Blu-ray disc 212 supports direct recording of MPEG transport streams.

To process multimedia signals retrieved from the Blu-ray disc 212, the system 210 includes a first signal processor 214 that demodulates and decodes the signal 133 according to the Blu-ray Disc standard and stores the multimedia signal in the DRAM 104. The multimedia signal output from the first signal processor 214 includes audio and video signals that are compressed according to the MPEG algorithm, and can be processed by the MPEG audio and video decoder 116, the audio DAC decoder 122, the video post-processor 126, and the TV encoder 130 for viewing and listening similar to the processes described above.

To process multimedia signals that are to be recorded in the Blu-ray disc 212, the system 210 includes an audio ADC 114, a video ADC 146, an MPEG audio encoder 152, an MPEG video encoder 154, and a program stream multiplexer 160 that operate similar to those in system 200. A program stream to transport stream encoder (abbreviated as PS-to-TS encoder) 216 is provided to convert the MPEG program stream generated by the program stream multiplexer 160 into an MPEG transport stream. A second signal processor 218 encodes and modulates the MPEG transport stream from the PS-to-TS encoder 216 according to the Blu-ray Disc standard, and generates an output 220 suitable for storage in the Blu-ray disc 212.

The systems 200 and 210 can be combined into one system that can record to or read from either a DVD disc or a Blu-ray disc. When playing multimedia content from an optical storage medium, the system controller 102 detects whether the optical recording medium is a DVD disc or a Blu-ray disc, and selects the appropriate signal processing module 134 or 214, respectively. When writing multimedia content to an optical storage medium, the system controller 102 detects whether the optical recording medium is a DVD disc or a Blu-ray disc, and selects the appropriate signal processor 162 or 218, respectively.

Figure 4:
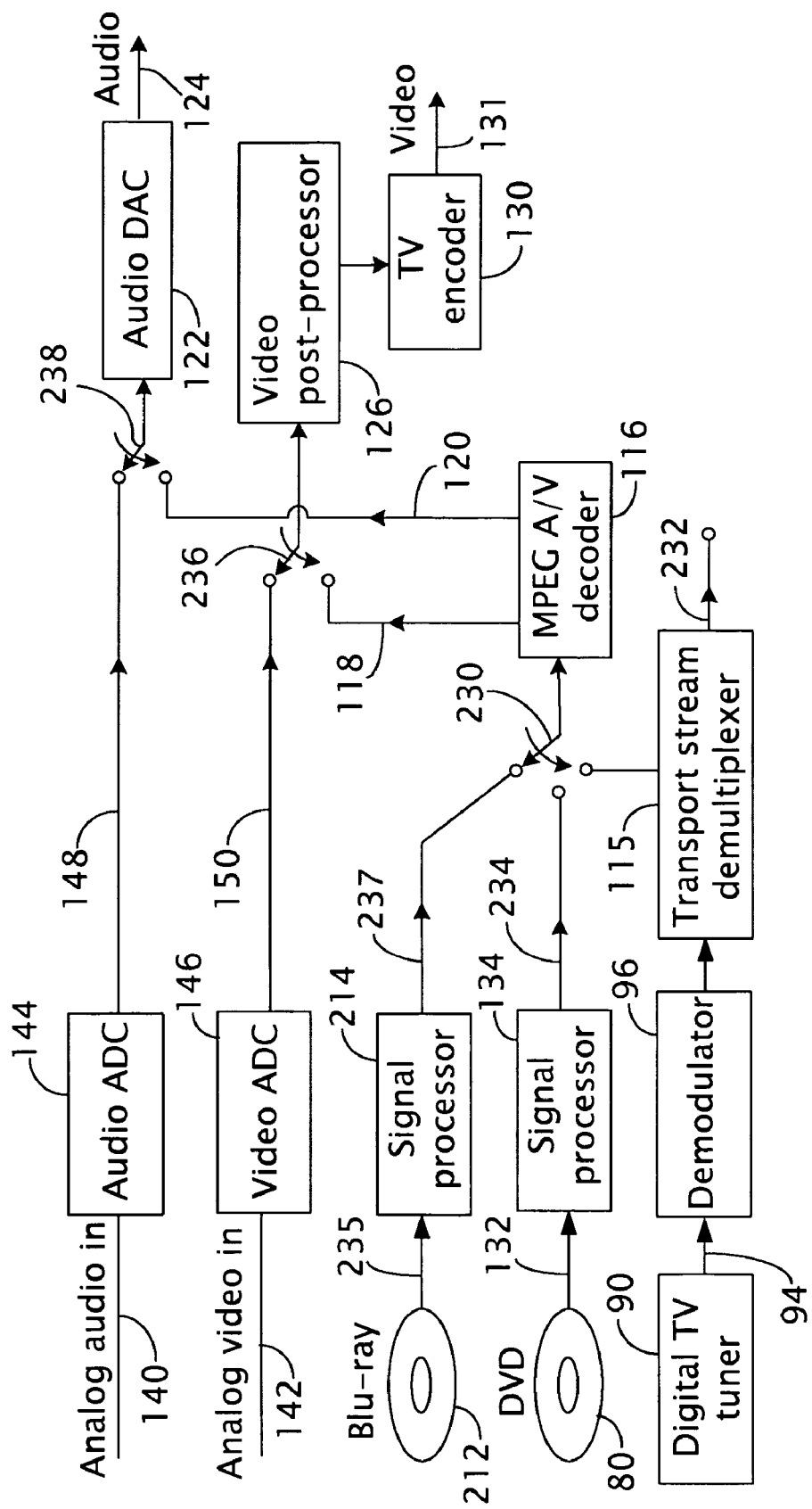
FIGS. 4-5 show signal flow diagrams representing the flow of signals in the combined digital TV decoding and optical recording system.

FIG. 4 shows a diagram representing the flow of signals in an example of the combined system when decoding audio and video signals for output to the speaker and display. The digital TV signal 94 from the digital TV tuner 90 is processed by the demodulator 96 and the transport stream demultiplexer 115 to generate a multimedia signal 232. A signal 132 read from the DVD disc 80 is processed by the first signal processor 134 to generate a multimedia signal 234. A signal 235 read from the Blu-ray disc 212 is processed by the first signal processor 214 to generate a multimedia signal 237. The system controller 102 controls a switch 230 to select the multimedia signal 232, 234, or 237, in which the selected signal is decoded by the MPEG A/V decoder 116 to generate a decoded video signal 118 and a decoded audio signal 120.

The analog audio signal 140 is converted into the digital audio signal 148 by the audio ADC 144. The analog video signal 142 is converted into the digital video signal 150 by the video ADC 146. The system controller 102 controls a second switch 236 to select the decoded video 118 or the digital video signal 150, in which the selected video signal is processed by the video post-processor 126 and the TV encoder 130 to generate an output video 131. The system controller 102 controls a third switch 238 to select the decoded audio signal 120 or the digital audio signal 148, in which the selected audio signal is processed by the audio DAC 122 to generate an output audio 124.

Figure 5:
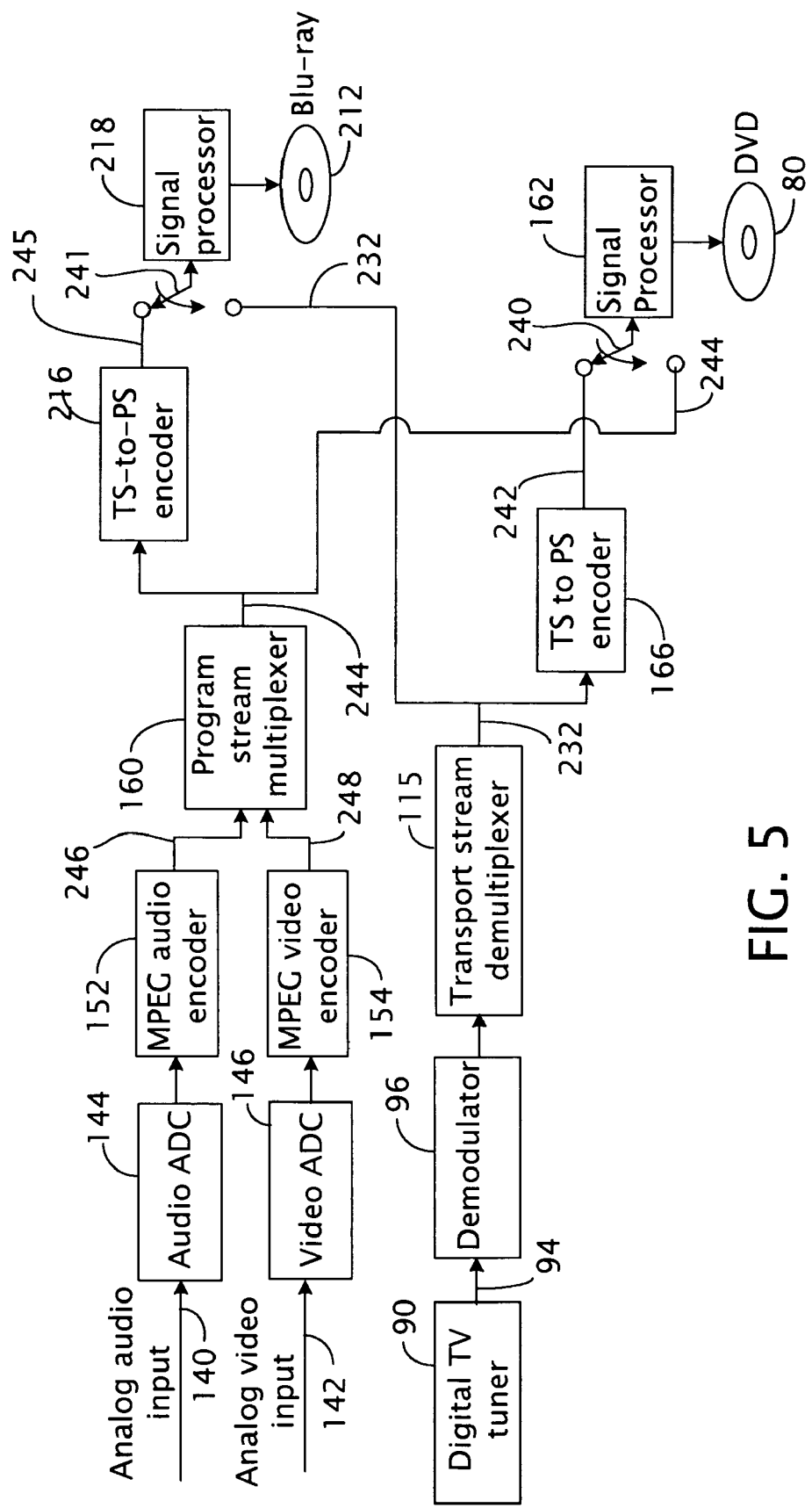

FIG. 5 shows a signal flow diagram representing the flow of signals in the combined system when encoding audio and video signals for storage in the DVD disc 80 or Blu-ray disc 212. The digital TV signal 94 from the digital TV tuner 90 is processed by the demodulator 96 and the transport stream demultiplexer 115 to generate an MPEG transport stream 232. The transport stream to program stream trans-encoder 166 converts the MPEG transport stream 232 into an MPEG program stream 242.

The analog audio signal 140 is processed by the audio ADC 144 and the MPEG audio encoder 152 to generate an MPEG encoded audio signal 246. The analog video signal 142 is processed by the video ADC 146 and the MPEG video encoder 154 to generate an MPEG encoded video signal 248. The program stream multiplexer 160 multiplexes the encoded audio and video signals 246 and 248 to generate a multiplexed program stream 244. The PS-to-TS encoder 216 converts the program stream 244 into an MPEG transport stream 245.

The system controller 102 can detect whether the optical recording medium is a DVD disc or a Blu-ray disc, and select the appropriate signal processor 162 or 218, respectively. When writing to the DVD disc 80, the system controller 102 controls a switch 240 to select the program stream 242 or 244, in which the selected program stream is processed by the second signal processor 162 and recorded to the DVD disc 80. When writing to the Blu-ray disc 212, the system controller 102 controls a switch 241 to select the transport stream 232 or 245, in which the selected transport stream is processed by the second signal processor 218 and recorded to the Blu-ray disc 212.

Although some examples have been discussed above, other implementations and applications are also within the scope of the following claims. For example, the DVD disc 80 can also be a CD disc, such as a CD-R (CD-Recordable) disc or CD-RW (CD-Rewritable) disc. In the above examples, the DVD disc supports direct recording of MPEG program streams, and the Blu-ray disc supports direct recording of MPEG transport streams. The optical disc recording standards may evolve such that it may be possible to record MPEG transport streams in a DVD disc and MPEG program streams in a Blu-ray disc. In that case, the PS-to-TS encoder 166 and the TS-to-PS encoder 216 may be omitted. Other types of optical recording medium may also be used, such as High-Definition DVD (HD DVD), MiniDisc, or magnetic-optical discs.

Various types of memory can be used in the systems 200 and 210. For example, the DRAM 104 can be synchronous DRAM, double data rate (DDR) DRAM, or reduced latency DRAM. Static random access memory (SRAM) can also be used, including quad data rate SRAM. The memory 104 does not necessarily have to be a single chip. The memory 104 can include multiple banks or multiple chips. Allocation of a first portion of memory to store data used during the processing of the digital TV signal is partially dependent on the encoding of the video signal for optical storage. Similarly, allocation of a second portion of the memory to store data used during encoding of the video signal for optical storage is partially dependent on processing of the digital TV signal.

A combined digital radio decoder and optical recording system can be implemented using the principles described above. A common system controller controls a digital radio and optical storage processing module, which executes a first process for processing a digital radio signal, a second process for processing audio signals to be recorded to an optical storage medium, and a third process for processing encoded audio signals retrieved from the optical storage medium. A common memory stores data generated by the digital radio and optical storage processing module while executing the first, second, and third processes. By using a common system controller and a common memory, system resources can be used more efficiently and the amount of memory can be reduced.

For example, the user may be listening to a first digital radio program at the same time that a second digital radio program is recorded to the optical storage medium. Or the user may be listening to a first digital radio program at the same time that an analog audio signal is recorded to the optical storage medium. The system controller allocates a first portion of the memory for decoding the digital radio signal, and allocates a second portion of the memory for processing the audio signal to be recorded to the optical storage medium. The system controller determines the sizes of the first and second memory portions based on operation requirements, and the sizes of the first and second memory portions may change over time.

The system controller 102 can have many components, and does not necessarily have to be a single chip or be embedded in a combined-system chip. The system controller 102 controls the processing of the digital TV signal in a way that is partially dependent on the encoding of the video signal for optical storage. Similarly, the system controller controls the encoding of the video signal for optical storage in a way that is partially dependent on processing of the digital TV signal. In one example, the first and second signal processors 134 and 162 are the same signal processor executing different software code. In another example, the first and second signal processors 214 and 218 are the same signal processor executing different software code. In another example, the signal processors 134, 162, 214, and 218 are the same signal processor executing different software code.

What is claimed is:

1. A method, comprising:
   using a controller to control operations of a first module for decoding a digital TV signal and a second module for encoding a video signal for recording to an optical recording medium;
   storing data used during operations of the first and second modules in a shared memory, in which allocation of a first portion of the memory to store data used by the first module is partially dependent on an operation condition of the second module; and
   adjusting speeds of the first and second modules so that peak requirements of the memory from the first and second modules occur at controlled times.

* * * * *